(12) United States Patent
Gabbey et al.

(10) Patent No.: US 12,163,610 B2
(45) Date of Patent: *Dec. 10, 2024

(54) QUICK CONNECTOR WITH VERIFICATION

(71) Applicant: TI GROUP AUTOMOTIVE SYSTEMS, LLC, Auburn Hills, MI (US)

(72) Inventors: David Gabbey, Pinckney, MI (US); Cody Rydin, Sterling Heights, MI (US); Iris Barthel, Schauenburg (DE); Kay Bube, Schenklengsfeld (DE); André Häckel, Waldeck (DE); Reiner Rohde, Malsfeld (DE)

(73) Assignee: TI GROUP AUTOMOTIVE SYSTEMS, LLC, Auburn Hills, MI (US)

( * ) Notice: Subject to any disclaimer, the term of this patent is extended or adjusted under 35 U.S.C. 154(b) by 39 days.

This patent is subject to a terminal disclaimer.

(21) Appl. No.: 18/164,832

(22) Filed: Feb. 6, 2023

(65) Prior Publication Data
US 2023/0184360 A1 Jun. 15, 2023

Related U.S. Application Data

(63) Continuation-in-part of application No. 17/205,301, filed on Mar. 18, 2021, now Pat. No. 11,598,463.

(51) Int. Cl.
*F16L 37/12* (2006.01)
(52) U.S. Cl.
CPC ....... *F16L 37/1225* (2013.01); *F16L 2201/10* (2013.01)
(58) Field of Classification Search
CPC ... F16L 37/1225; F16L 37/12; F16L 37/0841; F16L 37/084; F16L 37/0844;
(Continued)

(56) References Cited

U.S. PATENT DOCUMENTS 9,677,699 B2 6/2017 Barthel et al.
2012/0242080 A1* 9/2012 Nezu ................. F16L 37/0841
285/93
(Continued)

FOREIGN PATENT DOCUMENTS

DE 102018219440 A1 5/2020
DE 202020103903 U1 8/2020
(Continued)

OTHER PUBLICATIONS

TI Automotive (Fuldabrück) GMBH, Machine-generated translation of DE 202020103903 U1, published Aug. 20, 2020.

*Primary Examiner* — Aaron M Dunwoody
(74) *Attorney, Agent, or Firm* — DICKINSON WRIGHT PLLC

(57) ABSTRACT

A quick connector coupling for making a severable connection with a male member in a fluid line includes a connector body having a through bore for receiving the male member having a tubular shape sized to extend into the through bore of the connector body, a retainer releasably securing the male member within the connector body, and a verifier including at least one arm extending outside the connector body. Further, the verifier is coupled to the connector body and is moved to a latched position from an unlatched position when the male member is securely connected with the connector body. The connector body includes at least one verification element, which is at least partially covered by the at least one arm extending from the verifier in the unlatched position. The verification element of the connector body is uncovered and readable when the verifier is moved to the latched position.

20 Claims, 12 Drawing Sheets

(58) Field of Classification Search
CPC . F16L 37/0847; F16L 37/096; F16L 37/1205; F16L 37/122; F16L 37/133; F16L 37/16; F16L 37/18; F16L 2201/10
See application file for complete search history.

(56) References Cited

U.S. PATENT DOCUMENTS

| | | | |
|---|---|---|---|
| 2014/0312614 | A1 | 10/2014 | Barthel et al. |
| 2016/0215909 | A9 | 7/2016 | Barthel et al. |
| 2020/0355308 | A1 | 11/2020 | Hunt et al. |
| 2021/0285581 | A1* | 9/2021 | Rydin .................... F16L 33/10 |
| 2021/0372550 | A1* | 12/2021 | Lanterman .......... F16L 37/1225 |
| 2022/0010907 | A1* | 1/2022 | Rydin ................ F16L 37/1225 |
| 2022/0243850 | A1* | 8/2022 | Teasley ............... F16L 37/1225 |
| 2022/0299143 | A1* | 9/2022 | Gabbey ................ F16L 37/144 |
| 2023/0184360 | A1* | 6/2023 | Gabbey ................ F16L 37/144 285/93 |
| 2023/0279979 | A1* | 9/2023 | Barthel .............. F16L 37/0982 |
| 2024/0068610 | A1* | 2/2024 | Hunt .................. F16L 37/0841 |

FOREIGN PATENT DOCUMENTS

| | | | |
|---|---|---|---|
| EP | 3736481 | A1 | 11/2020 |
| WO | 2020099454 | A1 | 5/2020 |
| WO | 2022169797 | A1 | 8/2022 |

\* cited by examiner

QUICK CONNECTOR WITH VERIFICATION

CROSS-REFERENCE TO RELATED APPLICATION

This application is a continuation-in-part of U.S. patent application Ser. No. 17/205,301 filed on Mar. 18, 2021, entitled "QUICK CONNECTOR WITH VERIFICATION," the entire contents of which are incorporated herein by reference.

FIELD

The present disclosure relates to a quick connector coupling for making a releasable connection in a fluid line assembly.

BACKGROUND

The statements in this section merely provide background information related to the present disclosure and may not constitute prior art.

Quick connectors are well-known devices in the automotive and other fields, and connector assemblies that allow for convenient, quick, fluid-tight connections between two or more pipes, tubes, or similar components. The quick connectors are commonly used to connect tubing used in engine cooling circuits or, more recently, in cooling circuits used to cool batteries of electric or hybrid vehicles. The quick connector assemblies generally include a male member such as a pipe or tube received and sealingly retained in a female connector body of the quick connector, and are used to provide a fluid connection between two components or conduits, thus establishing a fluid line between the two components.

Use of quick connector for securing the male member and the female connector body is advantageous in that a sealed and secured fluid line may be established with a minimum amount of time and expense. Such quick connector assemblies are very useful, for example, in the fluid line systems of internal combustion engine in a vehicle and also in the cooling circuits of the vehicle including the electric or hybrid vehicles. Furthermore, the reliable and secure quick connector couplings can be used in a brake line system, a fuel line system, a coolant line system, and other conduit systems.

We have discovered that many conventional quick connectors suffer from numerous drawbacks associated with locking together the components to be connected, resulting in failed connections, depressurizations, leaks, etc. To effectively assemble the sealed and secured fluid line, a number of methods and mechanisms for the quick connector are continuously developed and used in various fluid line systems.

SUMMARY

The present disclosure relates to a quick connector for securing a male member in a female connector in a fluid line assembly.

According to one aspect of the present disclosure, a quick connector coupling for making a severable connection with a male member in a fluid line includes a connector body having a through bore for receiving the male member having a tubular shape sized to extend into the through bore of the connector body, at least one verification element formed on the connector body, and a verifier including a connecting member and a pair of fingers extending from the connecting member and further including a combined upper end extending rearwardly from the connecting member of the verifier and at least one arm extending from the combined upper end. The verifier is coupled to the connector body and moved to a latched position from an unlatched position when the male member is securely connected with the connector body. Further, the at least one verification element of the connector body is at least partially covered by the at least one arm extending from the verifier in the unlatched position, and the at least one verification element of the connector body is uncovered and readable when the verifier is moved to the latched in a transverse direction relative to an insertion direction of the male member.

According to a further aspect of the present disclosure, the quick connector coupling further includes a retainer releasably securing the male member within the connector body. The retainer is positioned on an opposite side of the connector body from where the verifier is positioned such that the retainer is inserted in an opposite direction from a direction in which the verifier is moved to the latched position.

According to a further aspect of the present disclosure, the through bore of the connector body defines a longitudinal axis and the at least one arm is axially spaced apart from the pair of fingers. The connector body includes a radial rim extending through the axial space between the at least one arm and pair of fingers.

According to a further aspect of the present disclosure, the at least one verification element is positioned on an outer surface of the connector body, and arranged between a rearward rim and a rearmost rim of the connector body. Further, the at least one verification element is a readable code formed as a QR code, a barcode, a data matrix code, or a colored code.

According to a further aspect of the present disclosure, the at least one arm of the verifier is formed with an extension end transversely extending from the at least one arm along a longitudinal axis of the connector body. The extension end of the verifier is arranged between a rearward rim and a rearmost rim of the connector body and moved along an outer surface of the connector body. Further, in the unlatched position of the verifier, the verification element is at least partially covered by the extension end of the verifier, and the verification element is fully uncovered by the movement of the extension end when the verifier is moved to the latched position from the unlatched position.

According to another aspect of the present disclosure, a quick connector coupling for making a severable connection with a male member in a fluid line includes a connector body having a through bore for receiving the male member having a tubular shape sized to extend into the through bore of the connector body, at least one verification element formed on the connector body, and a verifier including a crossbar and a pair of fingers extending from the crossbar and further including at least one arm extending outside the connector body, and a retainer securing the male member within the connector body and including a pair of legs extending from the crossbar. The verifier is formed with the retainer, and the verifier and retainer are coupled to the connector body and moved to a latched position from an unlatched position when the male member is securely connected with the connector body. Further, the at least one verification element of the connector body is at least partially covered by the at least one arm extending from the verifier in the unlatched position, and the at least one verification element of the connector body is uncovered and readable when the at least one verification element of the verifier is moved to the latched position in a transverse direction relative to an insertion direction of the male member.

According to a further aspect of the present disclosure, the combined retainer and verifier is automatically moved to the latched position from the unlatched position when the male member is completely inserted into the connector body.

According to a further aspect of the present disclosure, the pair of fingers are longitudinally aligned with the pair of legs, and the at least one arm of the verifier is longitudinally spaced apart from the pair of fingers of the verifier.

According to a further aspect of the present disclosure, the verification element produces information about the quick connector coupling when the verification element is read out. For example, the verification element can contain readable information relating to the quick connector, in particular relating to the manufacturer, the article number, the type and material, the date of manufacture, and the batch number of the connector, etc. The at least one verification element is attached onto an outer surface of the connector body by a printing, a laser marking, a labeling, or an engraving.

According to another aspect of the present disclosure, a quick connector coupling for making a severable connection with a male member in a fluid line includes a connector body having a through bore for receiving the male member having a tubular shape sized to extend into the through bore of the connector body, a retainer securing the male member within the connector body, and a verifier being coupled to the connector body and being moved to a latched position from an unlatched position when the male member is securely connected with the connector body. The at least one arm includes an extension end transversely from the at least one arm along a longitudinal axis of the connector body and the extension end is sized and positioned to cover the at least one verification element in the unlatched position. Further, the connector body includes at least one verification element, which is readable when the verifier is moved to the latched position from the unlatched position, and the retainer is positioned on an opposite side of the connector body from where the verifier is positioned such that the retainer is inserted in an opposite direction from a direction in which the verifier is moved to the latched position.

According a further aspect of the present disclosure, the verifier includes at least one arm partially covering an outer surface of the connector body and moving along the outer surface of the connector body when the verifier is moved to the latched position from the unlatched position.

According to a further aspect of the present disclosure, the at least one verification element is located on the outer surface of the connector body is at least partially covered by the arm of the verifier and is not readable when the verifier is in the unlatched position. Further, the at least one verification element is fully uncovered and readable by the movement of the arm when the verifier is moved to the latched position. The verifier is formed with a pair of arms including a combined upper end extending rearwardly from a connecting member of the verifier.

Further details and benefits will become apparent from the following detailed description of the appended drawings. The drawings are provided herewith purely for illustrative purposes and are not intended to limit the scope of the present disclosure.

BRIEF DESCRIPTION OF THE DRAWINGS

In order that the disclosure may be well understood, there will now be described various forms thereof, given by way of example, reference being made to the accompanying drawings, in which.

Figure 1:
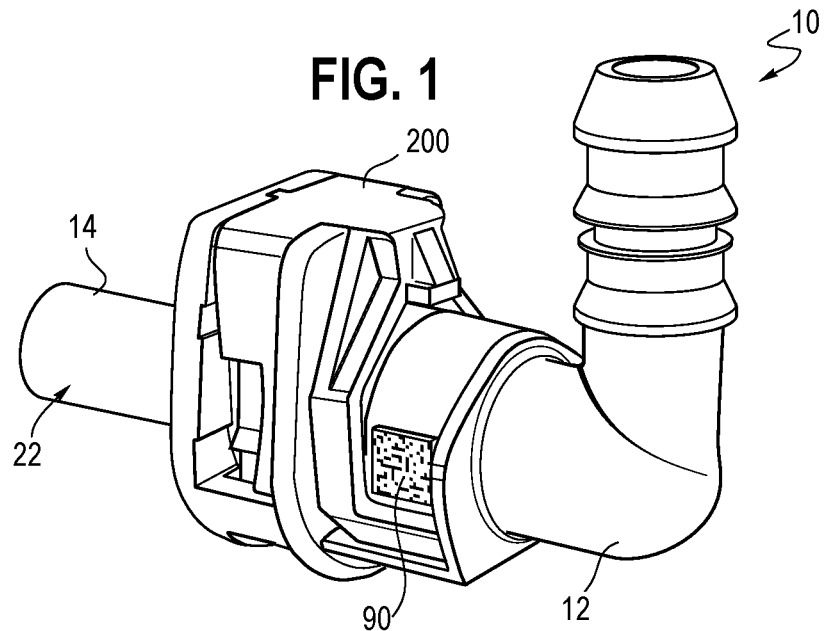
FIG. 1 shows a perspective view of a quick connector coupling in accordance with an exemplary form of the present disclosure.

The drawings described herein are for illustration purposes only and are not intended to limit the scope of the present disclosure in any way.

DETAILED DESCRIPTION

The following description is merely exemplary in nature and is in no way intended to limit the present disclosure or its application or uses. It should be understood that throughout the drawings, corresponding reference numerals indicate like or corresponding parts and features.

A quick connector coupling of the present disclosure is illustrated in connection with a fluid line assembly. It is shown as a releasable connection between a rigid tube and other fluid carrying components, particularly a flexible hose. However, the quick connector couplings have numerous other applications where a fluid tight, but releasable connection is desired, such as connection of rigid elements of a fluid path, whether pressurized or unpressurized in an automotive vehicle.

Figure 1A:
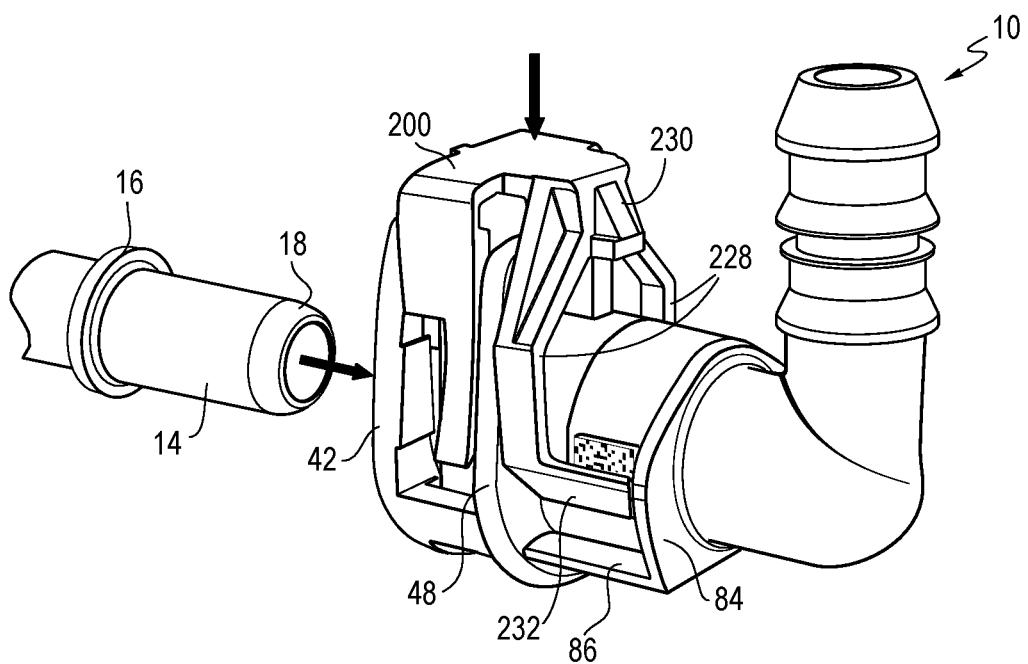
FIG. 1A shows a perspective view of a connector body and a male member in the quick connector coupling of FIG. 1.
Figure 2:
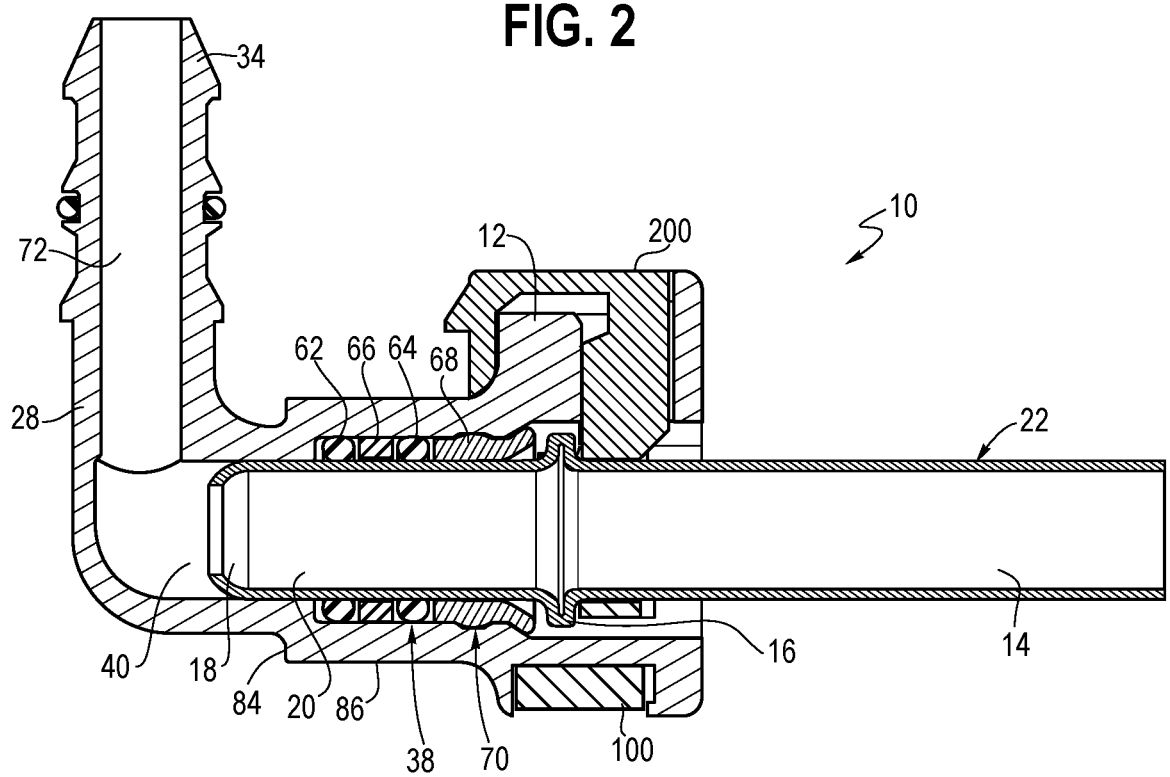
FIG. 2 shows a side sectional view of the quick connector coupling of FIG. 1.

Referring to more detail in the drawings, FIGS. 1 and 1A illustrate a quick connector coupling 10 for forming a severable connection in a fluid line. The quick connector coupling 10 is comprised of a connector body 12 and a male member 14. In FIG. 2, the quick connector coupling 10 is releasably secured together by a retainer 100 (e.g., a primary latch; see also FIG. 7) and a verifier 200 (e.g., a secondary latch; see also FIGS. 8 and 9). Further, as shown in FIGS. 1 and 1A, the quick connector coupling 10 includes at least one verification element 90, which is in the form of a code (e.g., a QR code, a barcode, a data matrix code, or a single or multi-colored color code). For example, a QR code is printed onto the outer surface of the connector body 12. The function of the verification element 90 is explained in more detail further below. The male member 14 is formed at an end of a hollow tube which forms a part of a fluid line system. The connector body 12 and the male member 14 are connectable to form a severable joint in the fluid line.

As shown in FIGS. 1, 1A, and 2, the male member 14 includes a radially enlarged upset 16 formed a given distance from an open tube end or tip 18. The tube end or tip 18 can be rounded or tapered to facilitate insertion of the male member 14 into the connector body 12. A smooth generally cylindrical sealing surface 20 defined by the exterior surface of the tube extends between the upset 16 and the tube end or tip 18. The tube continues in a direction away from the tube end beyond the upset 16 and defines a generally smooth cylindrical surface 22. The smooth cylindrical surface 22 has generally same diameter as the cylindrical sealing surface 20. In accordance with other forms of the present disclosure, instead of the upset, the male member 14 may include a groove, which is formed on the exterior surface of the male member 14. Generally, the exterior surface of the tube is inwardly indented to form the groove such that the groove of the male member may be adapted to retain with a retainer and/or a verifier inside a connector body (not shown).

Figure 3:
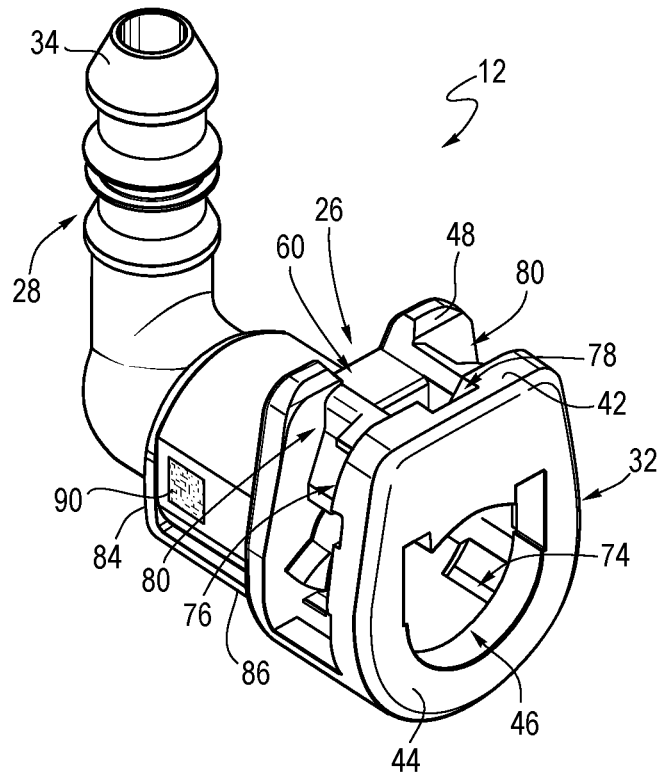
FIG. 3 shows a perspective view of a female connector body of FIG. 1.
Figure 4:
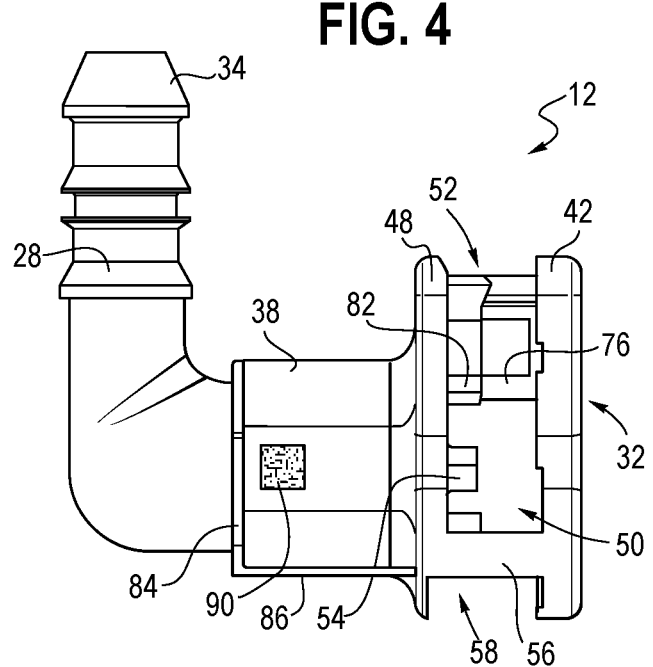
FIG. 4 shows a side view of the female connector body of FIG. 3.
Figure 5:
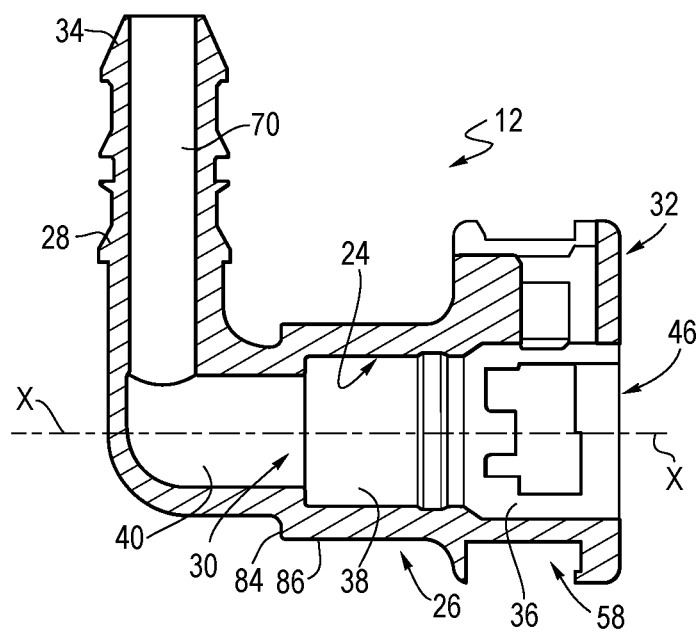
FIG. 5 shows a side sectional view of the female connector body of FIG. 3.
Figure 6:
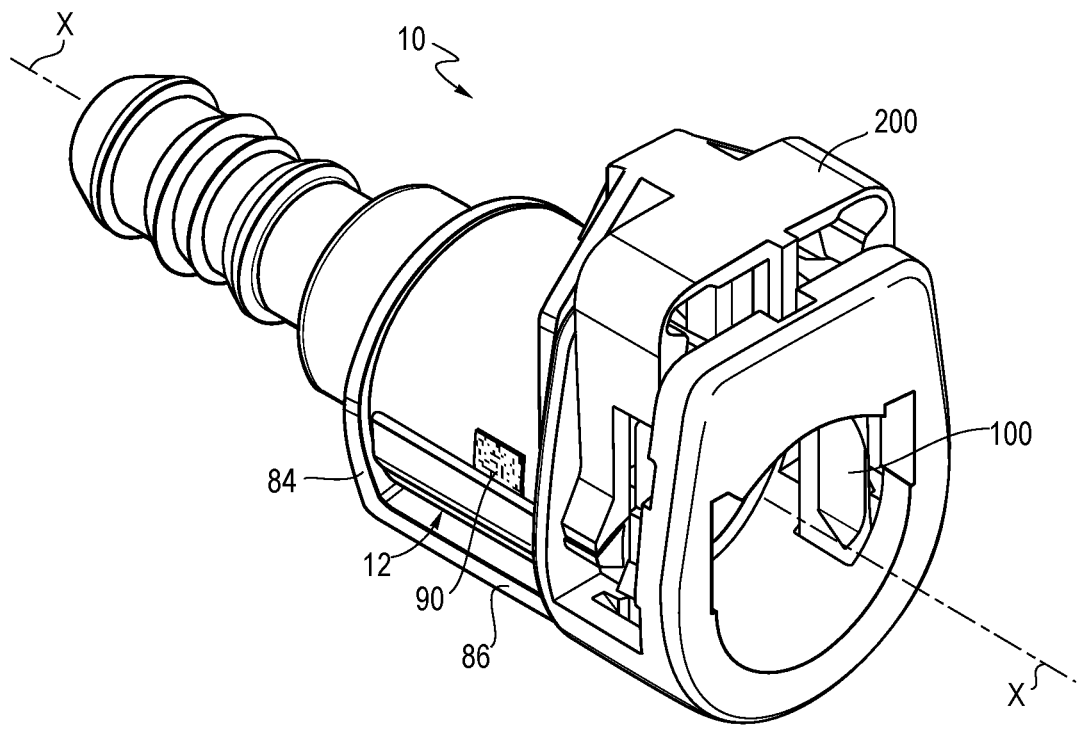
FIG. 6 shows a perspective view of a quick connector in accordance with another exemplary form of the present disclosure.

FIGS. 3-5 illustrate the female connector body 12 in detail. As shown in FIG. 5, the connector body 12 is defined by a generally cylindrical, stepped radially inner surface of wall 24, and includes a main body 26 for receiving the male member 14 and a cylindrical stem 28 extending from the main body 26 as a single unit. The cylindrical stem 28 including a hose connection end 34 is angled by 90 degrees, which is a transverse direction from a longitudinal axis X of the main body 26. In accordance with other forms of the present disclosure, however, the cylindrical stem 28 including the hose connection end 34 may extend from the main body 26 with a straight shape (180 degrees, see FIG. 6) along the longitudinal axis X. Further, the connector body in other forms of the present disclosure may be formed without the stem 28 such that the connector body (a tube end receptacle) is covered by a cap which has a closed face instead of the stem (not shown).

Figure 6A:
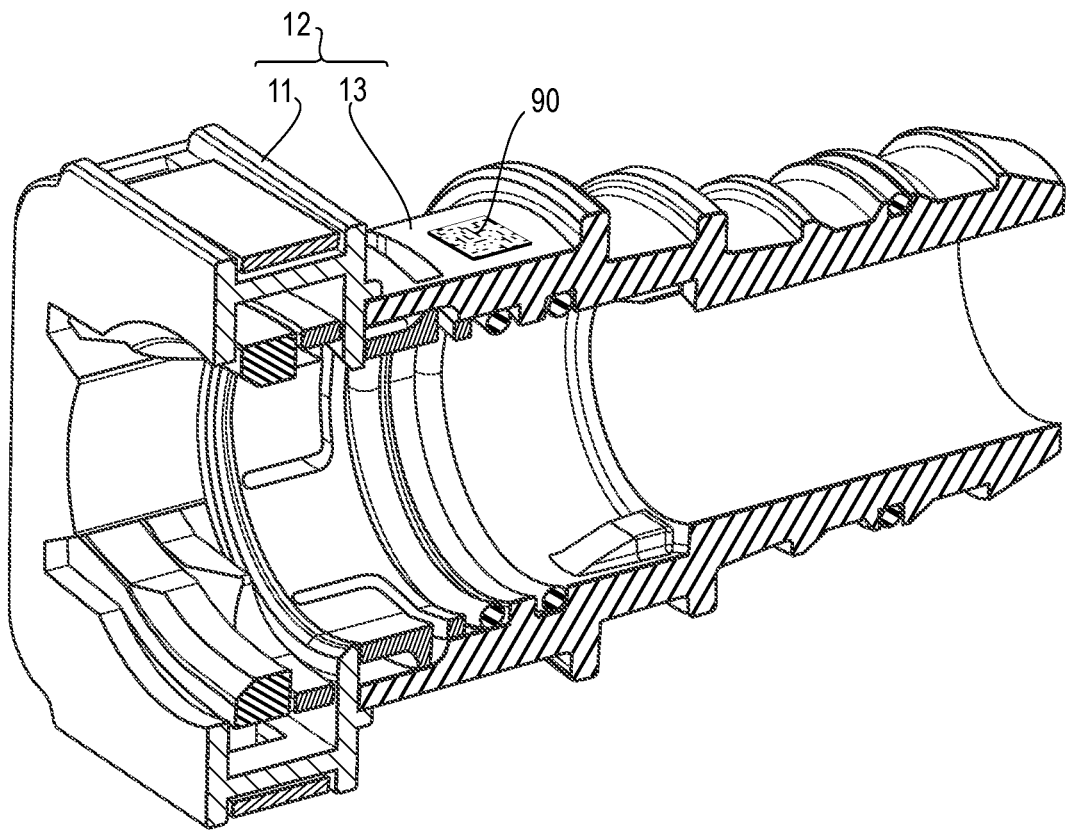
FIG. 6A shows a perspective view of a quick connector having a separate connector body in accordance with another exemplary form of the present disclosure.

In accordance with another exemplary form of the present disclosure, the connector body 12 may be combined by two different parts such as a retainer body 11 and a tube connection body 13. The tube connection body 13 is detachably coupled to the retainer body 11 by force-fitting, form-fitting, or material bonding (e.g., welding) as shown in FIG. 6A. Accordingly, in the connector body 12 formed by the tube connection body 13 and the retainer body 11, the verification element 90 is arranged in the tube connection body 13. However, according to other forms of the present disclosure, the verification element 90 may be arranged in the retainer body 11. Further, it must be understood that the exterior of the connector body 12 may take any desired shape without departing from the present disclosure.

The connector body 12 including the main body 26 and the cylindrical stem 28, as a single unit, is generally formed of a plastic material (e.g., polyamide). As shown in FIG. 5, the inner surface of the wall 24 defines a through bore 30 centered about the longitudinal axis X. The through bore 30 of the connector body 12 extends completely through the connector body 12 from a male member reception end 32 to the tube end receptacle 40 along the longitudinal axis X, and further transversely extends to the hose connection end 34. It should be noted that the term rearward is used herein to mean in a direction from the male member reception end 32 toward the tube end receptacle 40 generally along the longitudinal axis X, and the term forward is a reversed direction from the direction of the rearward along the longitudinal axis X.

As shown in FIGS. 3-5, the connector body 12 includes a housing section 36, a seal chamber 38, a tube end receptacle 40, and the stem 28. The housing section 36 is adjacent to the male member reception end 32. The housing section 36 is defined by a forward rim 42 having a transverse planar forward facing surface 44 that defines an opening 46 to the through bore 30 at the male member reception end 32, and a rearward rim 48 spaced from the forward rim 42 separated by a gap or space 50 opened to the through bore 30. Both forward and rearward rims 42 and 48 are connected by a top support member 52 and a bottom support member 56. In addition, center body posts 54 extend from a forward facing surface of the rearward rim 48. The lower curved surface of the bottom support member 56 is recessed radially inward from the radially outward most edge of the rearward rim 48 so that the bottom support member 56 and the forward and rearward rims 42 and 48 defines a pocket 58 that receives a cross member 104 of a retainer 100.

Figure 3A:
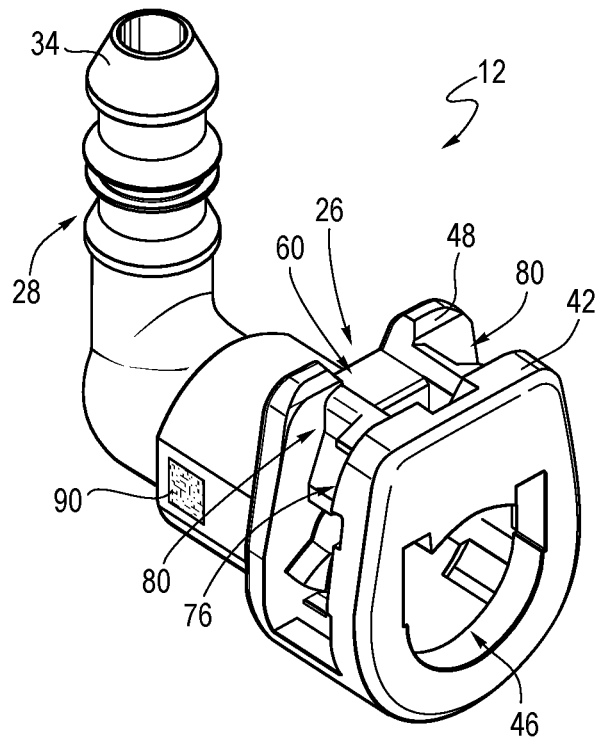
FIG. 3A shows a perspective view of a female connector body in accordance with another exemplary form of the present disclosure.

As shown in FIGS. 3 and 3A, for example, the top support member 52 is connected between the forward and rearward rims 42 and 48. A top portion of the rearward rim 48 includes a recess 60 that receives an inwardly facing surface 204 of a verifier 200. The recess 60 of the rearward rim 48 is disposed in the top support member 52. As shown in FIG. 3, the connector body 12 further includes a rearmost rim 84 extending radially around the connector body 12 and being located between the seal chamber 38 and the tube end receptacle 40. In addition, the rearward rim 48 and the rearmost rim 84 are connected with a support member 86 which axially extends along the longitudinal axis X. In accordance with other forms of the present disclosure, however, the connector body 12 may be formed without the rearmost rim 84 (see FIG. 3A). As shown in FIG. 3A, at least one verification element 90 is attached to one side or both sides on the outer surface of the connector body 12.

As shown in FIGS. 3 and 4, the connector body 12 includes at least one verification element 90, which is in a form of a code. For example, in the present application, the verification element 90 is formed as a QR code. The QR code is arranged and attached onto the outer surface of the connector body 12 between the rearward rim 48 and the rearmost rim 84. As shown in FIGS. 3 and 4, the QR code is printed or embedded in both side surfaces of the seal chamber 38 as a readable or visible location. However, the verification element 90 (e.g., a QR code) may be attached to other locations of the connector body 12 according to the operation of the quick connector coupling 10. In addition, the verification element 90 may be attached to other components such as the verifier 200 or the retainer 100 as a readable or visible location in accordance with other forms of the present disclosure.

The verification element 90 is a readable code, and preferably a machine-readable code such as a QR code or a barcode. For example, the code can be read out by a reading device such as a scanner or a mobile device (not shown). This verifies that the male member 14 is fully inserted into the connector body 12 and the quick connector coupling 10 is properly connected, i.e. is latched by the retainer 100 and verifier 200. Further, the code may contain readable information relating to the quick connector coupling 10, which can be read out after the connector body 12 and the male member 14 have been properly connected.

In FIG. 5, the seal chamber 38 is formed axially rearward of the housing section 36. It is defined by a reduced diameter portion of the wall 24, relative to the housing section 36 inside the seal chamber 38. The seal chamber 38 is provided to house sealing elements to form a fluid seal between the connector body 12 and the male member 14. As shown in FIG. 2, two O-ring seals 62 and 64 separated by a rigid spacer ring 66 are radially situated between the seal chamber 38 and the male member 14. The O-ring seals 62 and 64 are sized to fit tightly within the seal chamber 38 and tightly around the sealing surface 20 of the male member 14. The O-ring seals 62 and 64 are secured in the seal chamber 38 by a hollow spacer sleeve 68. The hollow spacer sleeve 68 includes a raised annular portion 70 on the outer periphery of the sleeve 68 for providing enhanced securement of the spacer sleeve 68 within the through bore 30.

The tube end receptacle 40 is formed axially rearward of the seal chamber 38. It is defined by a reduced diameter portion of the wall 24, relative to the seal chamber 38, which extends axially rearward. The tube end receptacle 40 is sized to receive and pilot or guide the sealing surface 20 of the male member 14. Furthermore, the stem 28 includes a fluid passageway 72 defined by the smallest diameter portion of the wall 24. It leads transversely from the small diameter of the tube end receptacle 40 to the hose connection end 34. The stem 28 is configured to facilitate connection to another component in the fluid line. For example, the connector body 12 is formed for connection to a flexible hose (not shown). As previously described, any other suitable connection arrangement may be used to complete a fluid line system.

Figure 7:
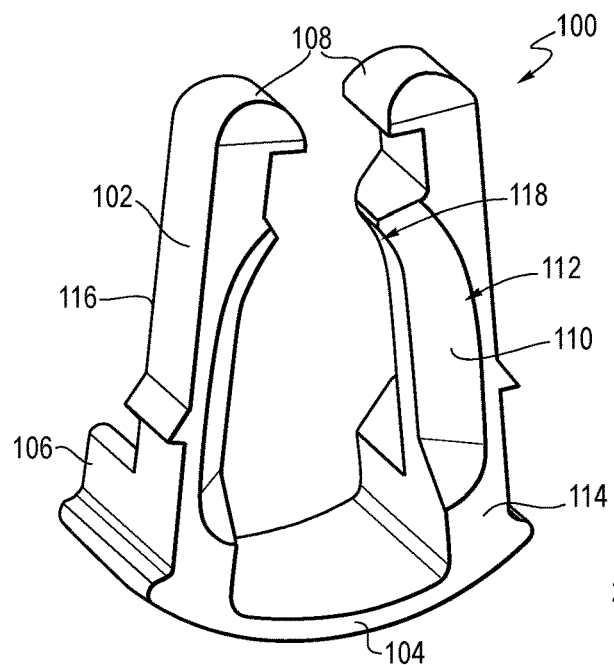
FIG. 7 shows a perspective view of a retainer of FIG. 1.

FIG. 7 illustrates the retainer 100 in the quick connector coupling 10. It is preferably formed of a resilient, flexible material such as plastic. The retainer 100, which extends transversely through bottom slots 74 of the housing section 36, is demountably coupled to the connector body 12. The retainer 100 includes a pair of elongated, generally parallel legs 102 extending from, and joined at one end by, a cross member 104. Released protrusions 106 are formed on the radially inner surface of the cross member 104 and extend axially from the rearward face of the legs 102. The cross member 104 provides a separation between the legs 102 approximately equal to the outer diameter of the cylindrical sealing surface 20 of the male member 14. The legs 102 have an axial length approximately equal to, but slightly less than the axial length of the bottom slots 74 in the housing section 36. The lateral width of legs 102 is significantly less than the lateral width of the bottom slots 74 in order to allow outward expansion of the legs 102 to permit the male member insertion and release as will be understood. In addition, the cross member 104 has an axial length substantially greater than that of the legs 102.

Each leg 102 includes a latch 108 formed at an end remote from the cross member 104. When the retainer 100 is fully inserted into the connector body 12, the latches 108 lock the retainer 100 into a position relative to the connector body 12. The latches 108 engage locking shoulders 76, defined by the top support member 52 of the connector body 12, to releasably lock the retainer 100 in place. As shown in FIG. 7, each leg 102 further includes an angled surface 110 with lead areas 112. The lead areas 112 are formed into the forward faces 114 of the legs 102. The lead areas 112 slope radially inward and axially rearward from the forward face 114 of each leg 102, and terminate approximately midway between the forward face 114 and the rearward face 116 of each leg 102.

The spacing between the lead edges of the lead areas 112 is at its greatest adjacent the forward face 114. The spacing is approximately equal to the outer diameter or outer surface of the upset 16 formed on the male member 14. At the inner edges 118 of the lead areas 112 is approximately equal to the outer diameter of the sealing surface 20 of the male member 14. Portions of the lead areas 112 closer to the latches 108 curve inwardly to match the annular profile of the male member upset 16. This shape assists in guidance and centering of the male member 14 through the connector body 12.

Figure 9:
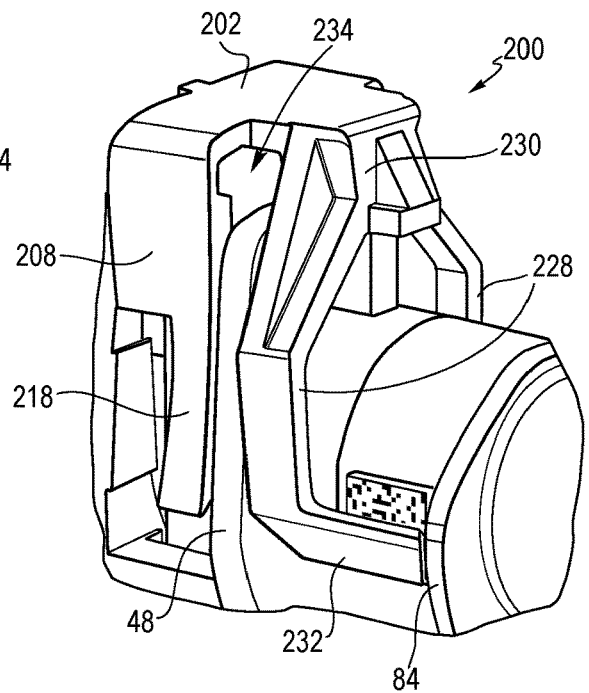
FIG. 9 shows a different perspective view of the verifier of FIG. 8.
Figure 8:
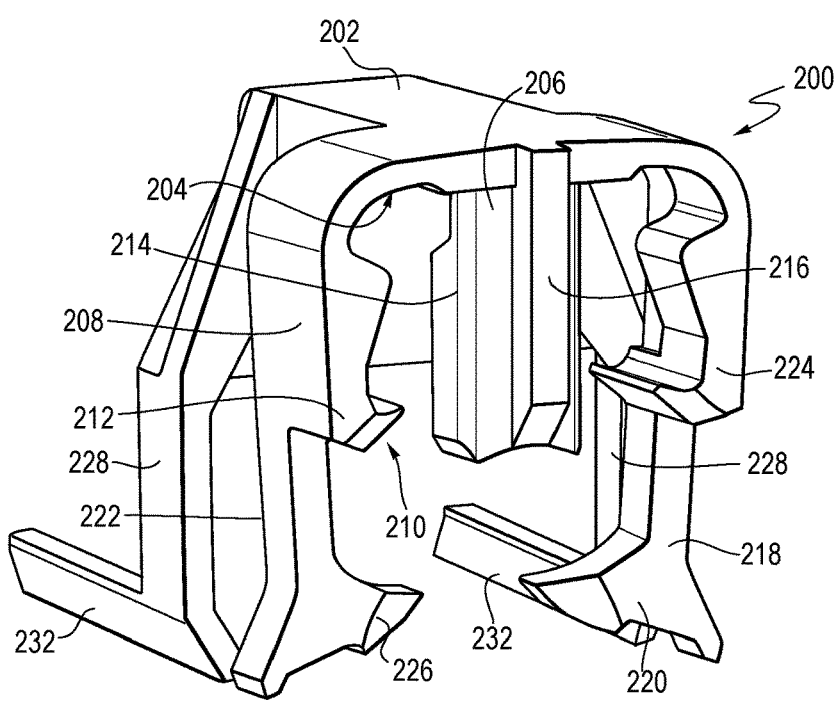
FIG. 8 shows a perspective view of a verifier of FIG. 1.

FIGS. 8 and 9 illustrate the verifier 200 including elements positioned within a top slot 78 and side slots 80. The verifier 200 is demountably coupled to the connector body 12. The verifier 200 is also preferably molded of a resilient and flexible material such as a plastic. The verifier 200 is slidable transversely in the connector body 12 relative to the top support member 52 toward and away from the curved bottom support member 56 and consequently the retainer 100 between a radially latched position and a radially unlatched position.

The verifier 200 includes a connecting member 202 with a radially inward facing surface 204 from which extend a retainer beam 206 and a pair of laterally spaced curved generally resilient fingers 208 extending downward from the connecting member 202 and in the same direction as the retainer beam 206. When assembled to the connector body 12, inwardly facing surface 204 generally overlies the top slot 78 of the connector body 12 with the retainer beam 206 slidably disposed in the top slot 78. Each finger 208 resides in one of the side slots 80.

Each finger 208 includes a knuckle 210 having a laterally inward directed hook 212. The hooks 212 of the finger 208 engage locking ridges 82 defined by the top support members 52 to releasably secure the verifier 200 to the connector body 12 when the verifier 200 is in its unlatched position. The retainer beam 206 of the verifier 200 includes a laterally enlarged portion 214 and a narrowed portion 216. The lateral width of the enlarged portion 214 is slightly less than the lateral width of the enlarged portion of the top slot 78 formed on the top support member 52, and the lateral width of the narrowed portion 216 is slightly less than the lateral width of the narrowed portion of the top slot 78 so that the verifier 200 moves between the latched position and the unlatched position.

As shown in FIG. 8, each finger 208 of the verifier 200 further includes an extension beam 218 extending from the end of the knuckle 210 and terminating at a verifying tab 220 formed at its free or distal end. The rearward faces 222 of the extension beams 218 and the verifying tabs 220 are planar with the rear surfaces of the knuckles 210. However, the forward faces 224 of the extension beams 218 and the verifying tabs 220 are spaced axially rearward from the forward face of the knuckles 210 such that the axial thickness of the extension beam 218 and the verifying tab 220 is less than the axial thickness of the knuckle 210. The difference between the thickness of the extension beams 218 and the verifying tabs 220 and the thickness of the knuckle 210 is such that it is at least as large as the thickness or axial length of the upset 16 of the male member 14.

Each verifying tab 220 includes a lead-in ramp surface 226 formed into the forward face 224 of the verifying tab 220. The lead-in ramp surface 226 slopes radially inward and axially rearward from the forward face 224 of each verifying tab 220. The shape and the spacing of the lead-in ramp surfaces 226 match the annular profile of the upset 16 of the male member 14 allowing the upset 16 to contact the lead-in ramp surface 226 upon insertion of the male member 14 into the connector body 12 when the verifier 200 is in its unlatched position. Accordingly, the spacing between opposing verifying tabs 220 is greater than spacing necessary for the cylindrical sealing surface 20 to be inserted into the connector body 12 without contacting the verifying tab 220 when the verifier 200 is in the unlatched position. In the assembled configuration, the verifying tab 220 is shaped and sized to engage the center body posts 54 of the connector body 12 such that the verifier 200 is moved in the latched position from the unlatched position.

The verifier 200 further includes at least one arm 228 extending outside the connector body 12. In an exemplary embodiment of FIG. 9, the verifier 200 includes a pair of arms 228 additionally extending downward from the connecting member 202, which is the same direction as the pair of fingers 208. The pair of arms 228 and the pair of fingers 208 are spaced apart from each other in the longitudinal axis X of the connector body 12 such that a space 234 between the pair of fingers 208 and the pair of arms 228 is formed to receive the rearward rim 48 of the connector body 12 when the verifier 200 is initially assembled to the connector body 12 (see FIGS. 1 and 1A). As shown in FIG. 9, the pair of arms 228 include a combined upper end 230 which extends rearwardly from the connecting member 202 of the verifier 200 such that the pair of fingers 208 of the verifier 200 are coupled inside the connector body 12 and the pair of arms 228 of the verifier 200 are arranged outside the connector body 12. In particular, the pair of arms 228 are radially (or circumferentially) arranged outside the circular seal chamber 38 of the connector body 12 when the verifier 200 is assembled to the connector body 12.

Further, in FIGS. 1 and 1A, each of the arms 228 includes an extension end 232, which extends rearwardly along the longitudinal axis X of the connector body 12 such that the extension end 232 is arranged between the rearward rim 48 and the rearmost rim 84 of the connector body 12. The extension ends 232 are radially positioned within the confines of the rims 48 and 84 such that the rims help guide movement of the arms 228, although the arms 228 and the extension ends 232 can also have portions extending radially beyond the rims 48 and 84. The size of the extension end 232 is enough to cover the verification element 90 attached to the connector body 12 in the unlatched position of the verifier 200. Accordingly, the extension end 232 of the verifier 200 covers the verification element 90 attached to the outer surface 88 of the connector body 12 when the verifier 200 is in the unlatched position such that the verification element 90 is not readable or detectable, and when the verifier 200 is moved to the latched position from the unlatched position, the extension end 232 of the verifier 200 is transversely (or along the outer surface of the connector body) moved down to uncover the verification element 90 such that the verification element 90 is read out by the scanner or mobile device (not shown). Further, when the verifier 200 is transversely moved back to the unlatched position from the latched position, the verification element 90 is re-covered and is rendered unreadable again.

Figure 10:
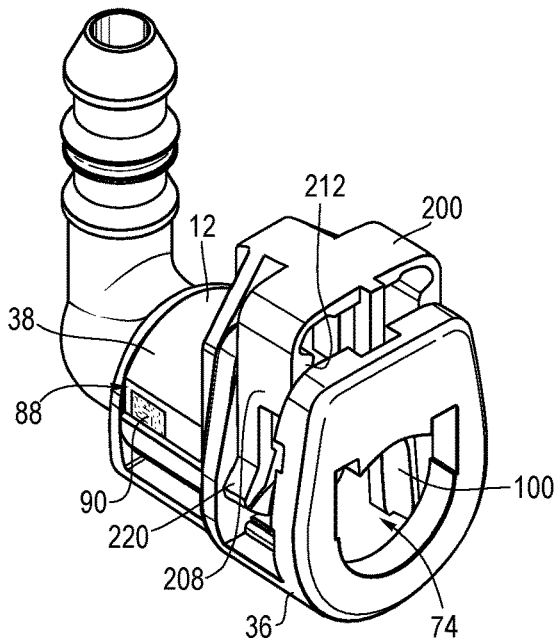
FIG. 10 shows a perspective view of the connector body including the retainer and the verifier in an unlatched position of the verifier of FIG. 1.
Figure 11:
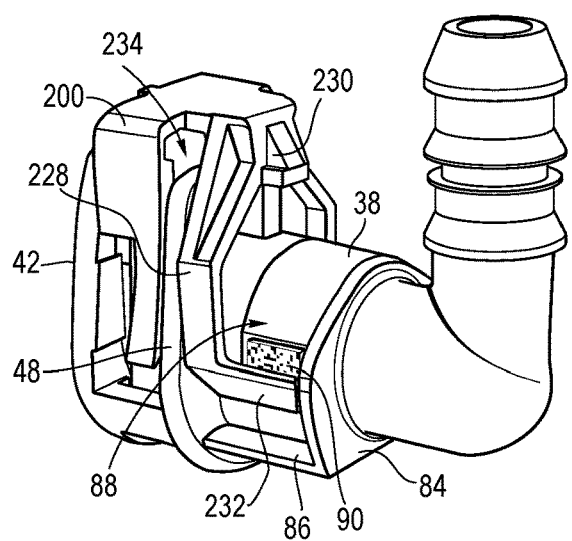
FIG. 11 shows a different perspective view of the connector body including the retainer and the verifier in the unlatched position of the verifier of FIG. 10.
Figure 12:
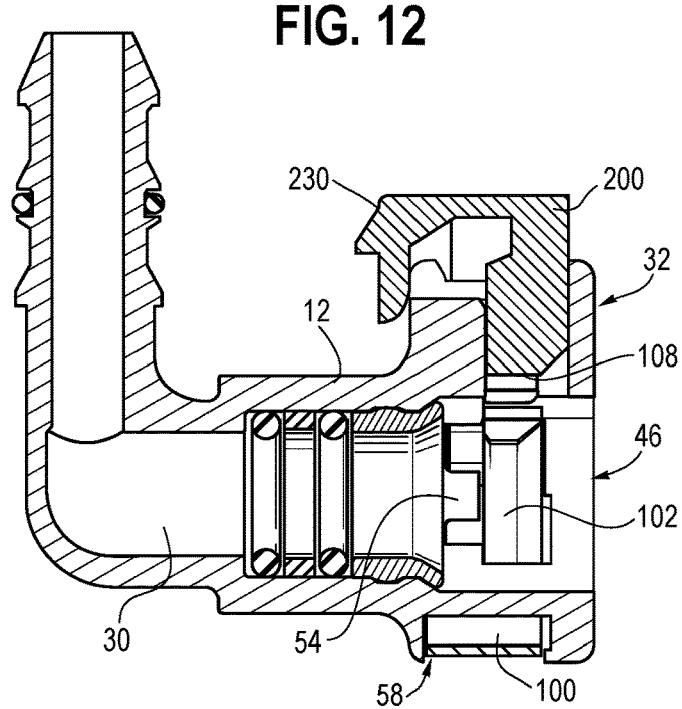
FIG. 12 shows a side sectional view of the connector body including the retainer and the verifier in the unlatched position of the verifier of FIG. 10.

FIGS. 10, 11 and 12 illustrate the connector body 12 with the installed the retainer 100 and the verifier 200 in the unlatched position of the verifier 200. The legs 102 of the retainer 100 is inserted into the bottom slots 74 in the housing section 36, and the cross member 104 is placed in the pocket 58 of the housing section 36. When the legs 102 are inserted into the housing section 36, the legs 102 spring inward with the latches 108 engaged with the locking shoulders 76 of the top support member 52 to secure the retainer 100 to the connector body 12. When the retainer 100 is secured in the connector body 12, furthermore, the lead areas 112 of the legs 102 face to the male member reception end 32.

The coupling is completed by positioning the verifier 200 into the latched position from the unlatched position. In the unlatched position, the verifier 200 is restrained from axially and radially moving relative to the connector body 12. The abutting relationships of the forward and rearward faces of the knuckles 210 with both forward and rearward rims 42 and 48 restrain the verifier 200 from the axial movement inside the housing section 36. The engagements of the hooks 212 of the fingers 208 with the locking ridges 82 of the top support member 52 restrain the verifier 200 from radially inward or transversely upward movement. In addition, the abutting relationships of the verifying tabs 220 with the center body posts 54 restrain the verifier 200 from radially outward or transversely downward movement. Accordingly, in this condition, the verifier 200 cannot be moved from the unlatched position and the verification element 90 of the connector body 12 is covered by the extension end 232 of the verifier 200 such that the verification element 90 is not readable or detectable.

With the retainer 100 and the verifier 200 properly attached to the connector body 12 in the unlatched position, as shown in FIGS. 1, 1A, and 2, the male member 14 is then inserted into the connector body 12. The cylindrical sealing surface 20 of the male member 14 passes between the legs 102 and into the seal chamber 38. When the upset 16 of the male member 14 contacts the legs 102, the lead areas 112 of the legs 102 permit passage of the upset 16 between the legs 102 upon applying sufficient axial inward force. As the upset 16 passes between the legs 102, it rides along the lead areas 112 and flexes the legs 102 radially outward. Once the upset 16 has passed the legs 102, the legs 102 springs back into place behind the upset 16 to a locked position. The rearward face 116 of the legs 102 abut the upset 16 to prevent subsequent inadvertent withdrawal of the male member from the connector body 12. In addition, the male member 14 is withdrawn from the connector body 12 by inwardly pushing on the cross member 104 of the installed retainer 100.

With the legs 102 of the retainer 100 in the locked position, the upset 16 flexes the fingers 208 of the verifier 200 laterally outward in side slots 80. Since the verifying tabs 220 are located transversely above the axis X of the through bore 30, and likewise above the axis X of the male member 14, the upper hemisphere of the upset 16 contacts the lead-in ramp surfaces 226 of the fingers 208 when the male member 14 is inserted rearward into the connector body 12. Contacting the upper hemisphere of the upset 16 with the fingers 208 not only applies a rearward directed force on the fingers 208, but it also applies an upwardly directed force on the fingers 208 pushing the verifier 200 transversely upward, or radially outward away from the axis X of the male member 14, allowing the verifying tabs 220 to clear the center body post 54 so that the fingers 208 are able to spread radially or laterally outward, without interference.

As described above, the fingers 208 of the verifier 200 are able to spread laterally outward only after the upset 16 of the male member 14 has completely passed the legs 102 of the retainer 100 (that is, the male member 14 is fully inserted into the connector body 12 and the legs 102 of the retainer 100 is in the locked position). The quick connector coupling 10 is completed by positioning the verifier 200 to the latched position with a transversely downward or radially inward force on the connecting member 202 (toward the connector body 12) when the male member 14 is fully inserted into the connector body 12. In the latched position, the rear surface of the retainer beam 206 is in axial abutting relationship with the upset 16 of the male member 14. This axial abutting relationship between the retainer beam 206 and the upset 16 provides the verifier 200 with the verifier feature to retain the male member 14 in the connector body 12 when the retainer 100 is failed to lock the male member 14. Also, the radially inner surface of the retainer beam 206 abuts the outer surface of the male member 14. This ability of the verifier 200 to move radially inward to the latched position provides visual verification to the user that the male member 14 has been properly inserted into the connector body 12.

In addition to providing the visual verification as described above, the verifier 200 of the present disclosure is also able to allow a readable machine such as a scanner or a mobile device to read or detect the connector coupling status that the male member 14 has been correctly inserted into and properly connected to the connector body 12. As shown in FIGS. 1 and 1A, the quick connector coupling 10 of the present disclosure includes the verification element 90 such as a QR code or a barcode, which is readable and/or detectable when the verifier 200 is in the latched position, while the verification element 90 is not readable and/or detectable when the verifier 200 is in the unlatched position. In the unlatched position of the verifier 200 (see FIG. 1A), the verification element 90 attached onto the outer surface 88 of the connector body 12 is partially or fully covered by the extension end 232 of the verifier 200 such that the verification element 90 is blocked by the extension end 232, which is not readable or detectable and cannot be read out by the readable machine. When the male member 14 is inserted into the connector body 12 and the verifier 200 is moved down to the latched position (see FIG. 1) from the unlatched position, the extension end 232 is downwardly moved along the outer surface of the connector body, which is in a transverse direction relative to the longitudinal axis X of the connector body 12 such that the verification element 90 is no longer covered by the extension end 232, which is readable or detectable and can be read out by the readable machine. Accordingly, the verification element 90 which is readable or detectable in the present disclosure is a clear indication that the male member 14 is properly inserted into the connector body 12.

Figure 13:
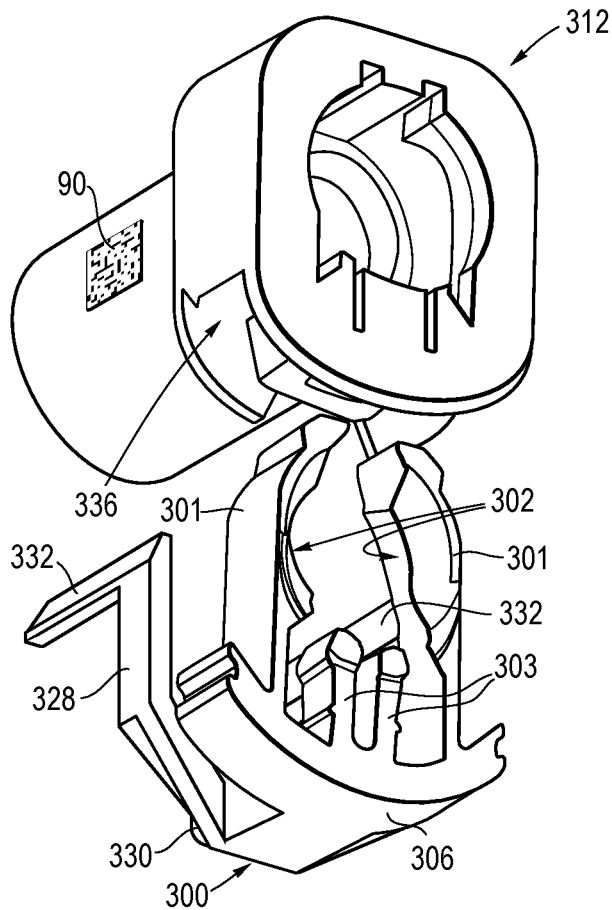
FIG. 13 shows a perspective view of a quick connector having a verifier combined with a retainer as a single unit in accordance with another exemplary form of the present disclosure.
Figure 13A:
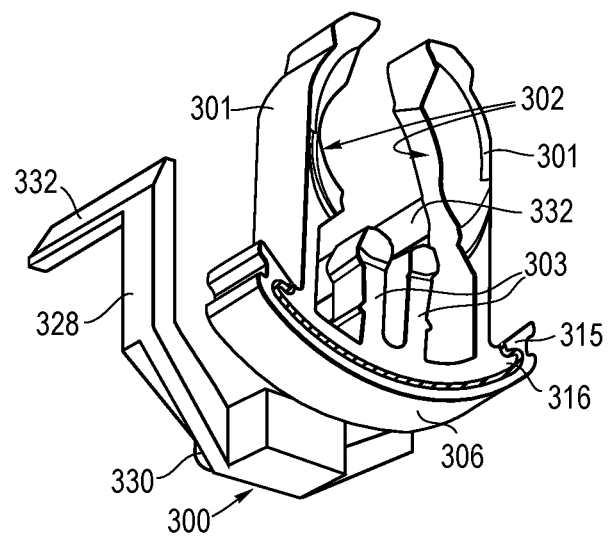
FIG. 13A shows a perspective view of a verifier combined with a retainer as a separate part in accordance with another exemplary form of the present disclosure.

In accordance with another exemplary form of the present disclosure, FIGS. 13 and 13A show a verifier 300 formed with a retainer 302. In FIG. 13, the retainer 302 and the verifier 300 are integrally formed as a one-piece part (i.e., a single unit), and in FIG. 13A, the retainer 302 and the verifier 300 are formed as separate parts and connected in force-fitting or form-fitting manner. As shown in FIG. 13A, the retainer 302 is fastened to the verifier 300 in that the retainer 302 is clamped to the verifier 300. The verifier 300 has a projection 315 which projects radially inward. In a similar manner, the retainer 302 includes a lug 316 which is directed radially outward and which engages with the projections 315 of the verifier 300. As a result, the retainer 302 of this embodiment can no longer be released from the verifier 300 in any radial direction. Detaching and reattaching the retainer 302 to the verifier 300 is only possible by moving the retainer 302 in the longitudinal direction X. The projection 315 of the verifier 300 and the lug 316 of the retainer 302 are formed in such way that when inserting the retainer 302 onto the verifier 300, there is also a force fit, whereby the retainer 302 is permanently and securely fastened to the verifier 300.

The connector body 312 includes at least one verification element 90 arranged in an outer surface of the connector body 312. As shown in FIG. 13, the connector body 312 is generally same feature as the connector body 12 of FIGS. 1 and 1A with an exception of the housing section 336 receiving the verifier 300 combined with the retainer 302. As shown in FIGS. 13 and 13A, two retainer legs 301 and the pair of locking fingers 303 are attached to a crossbar 306 formed in the verifier 300. Further, the verifier 300 includes at least one arm 328 extending outside the connector body 312 and having an extension end 332 to cover the verification element 90 when the verifier 300 is in an unlatched position (see FIG. 14A), When the verifier 300 is moved to a latched position from the unlatched position as shown in FIG. 14B, the verification element 90 is uncovered and read out as described above in the embodiment of FIGS. 1 and 1A.

Figure 14A:
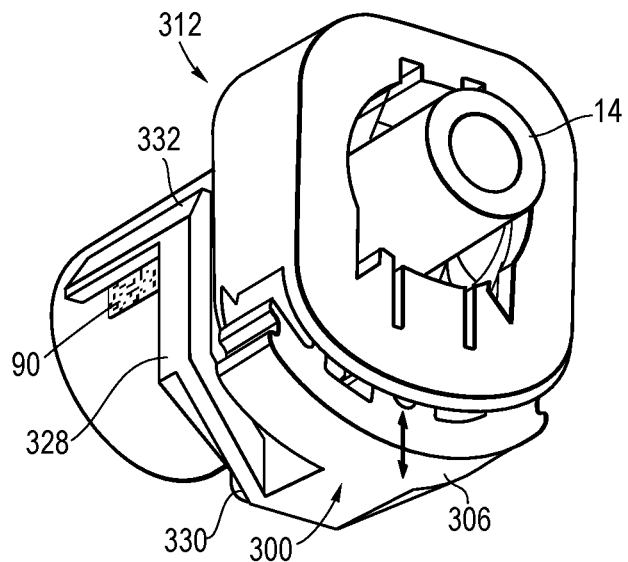
FIG. 14A shows a perspective view of the quick connector coupling with an inserted male member in an unlatched position of FIG. 13.
Figure 14B:
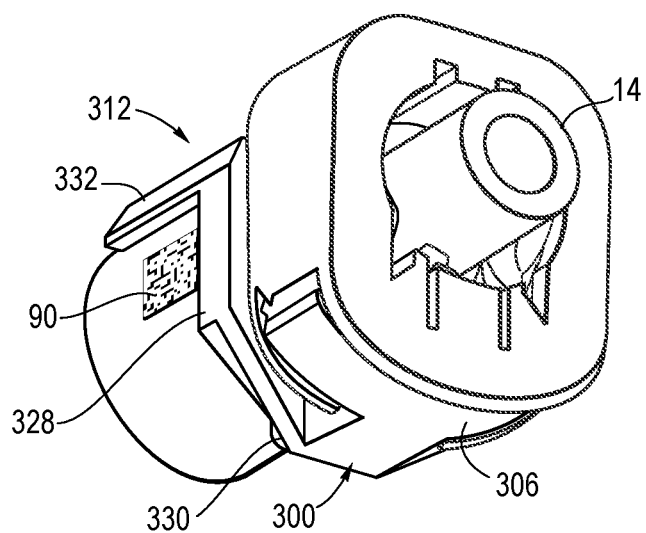
FIG. 14B shows a perspective view of the quick connector coupling with the inserted male member in a latched position of FIG. 13.

As shown in FIGS. 14A and 14B, the housing section 336 of the connector body 312 is formed to receive the verifier 300 and also secure the connection of the male member 14, which is inserted into the connector body 312. The connector body 312 having the verifier 300 combined with the retainer 302 is used in a TI Easy Loc connector, which is disclosed in U.S. Pat. No. 9,677,699 B2, filed on Oct. 23, 2014, entitled "Coupling", incorporated herein by reference.

Figure 15A:
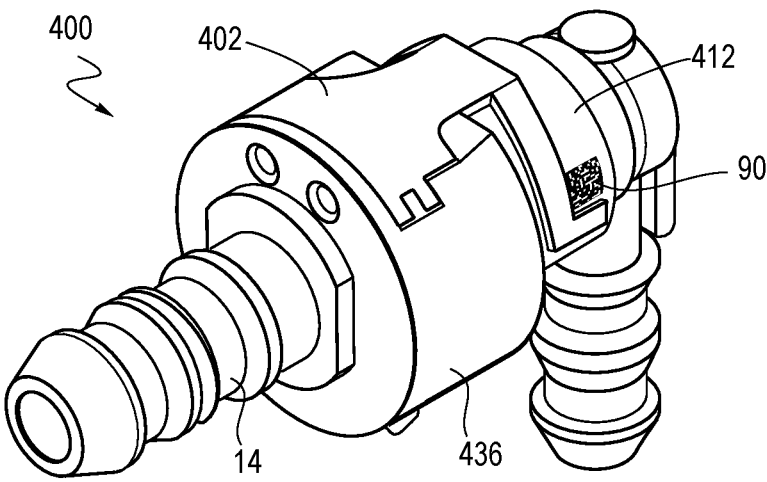
FIG. 15A shows a perspective view of a coupling connector with a plug lock in a latched position in accordance with another exemplary form of the present disclosure.
Figure 15B:
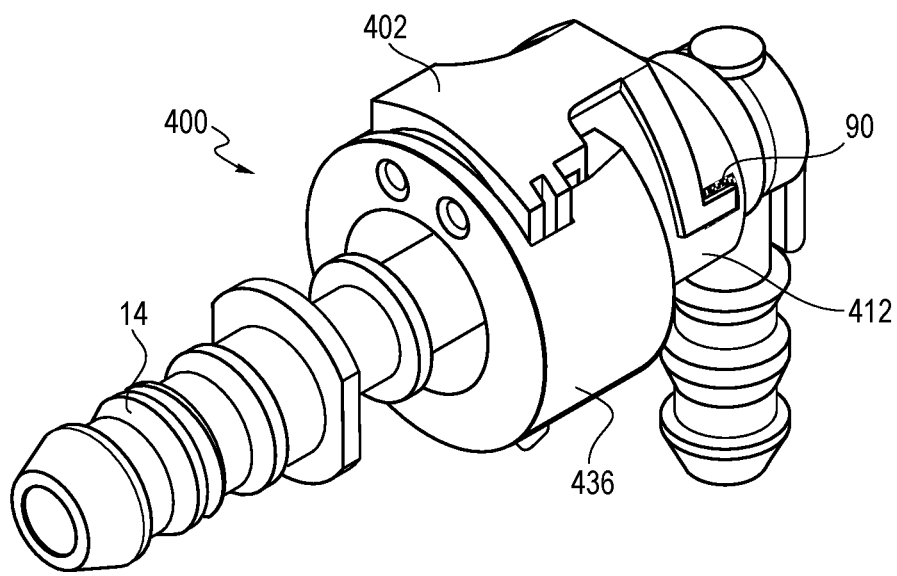
FIG. 15B shows a perspective view of the coupling connector the plug lock in an unlatched position of FIG. 15A.

In accordance with another exemplary form of the present disclosure, FIGS. 15A and 15B show a coupling connector 400 having a connector body 412 and a male member 14 with a plug lock 402. The connector body 412 includes a verification element 90 arranged in an outer surface of the connector body 412. In FIG. 15A, the plug lock 402 is in a latched position such that the verification element 90 is uncovered and read out as described above in the embodiment of FIGS. 1 and 1A. In FIG. 15B, the plug lock 402 is in an unlatched position such that the verification element 90 is covered and is not read out. As shown in FIGS. 15A and 15B, the connector body 412 is generally same feature as the connector body 12 of FIGS. 1 and 1A with an exception of a housing section 436 receiving the plug lock 402.

Figure 16:
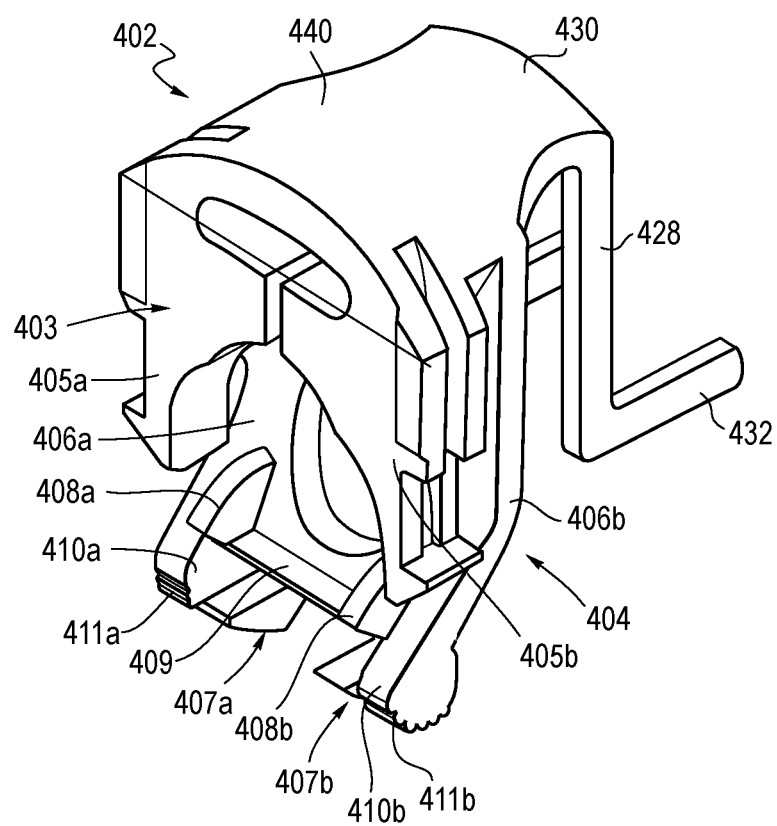
FIG. 16 shows a perspective view of the plug lock of the coupling connector of FIG. 15A.

FIG. 16 shows the plug lock 402 inserted from above, and hence in a radial direction or insertion direction, into the housing section 436 of the connector body 412 such that the plug lock 402 can be moved in the connector body 412 between the latched position and the unlatched position. According to the present disclosure, when the male member 14 is completely inserted into the connector body 412, the plug lock 402 is automatically moved to the latched position (see FIG. 15A) from the unlatched position (see FIG. 15B). Further, the plug lock 402 is moved to the unlatched position from the latched position by a manual pressure. As shown in FIG. 16, the plug lock 402 has a retainer 403 and a verifier 404, which are integrally formed as a single unit.

In FIG. 16, the retainer 403 has a pair of legs 405a and 405b to secure the plug lock 402 inside the housing section 436 of the connector body 412. The verifier 404 has a pair of fingers 406a and 406b extending from a cross bar 440 downwardly (i.e., in a radial direction or in an insertion direction). Further, the fingers 406a and 406b are axially spaced apart from the legs 405a and 405b rearwardly along the longitudinal axis to form a gap receiving the radial upset 16 of the male member 14 when the male member 14 is completely inserted into the connector body 412 (see FIG. 17A). The ends of the fingers 406a and 406b are bent toward the legs 405a and 405b of the retainer 403 along the longitudinal direction, and arranged on a bottom of the housing section 436 of the connector body 412. In addition, the bottom-side ends of the fingers 406a and 406b have impact surfaces 407a and 407b and also contact ramps 408a and 408b for contacting the upset 16 of the male member 14. Further, the fingers 406a and 406b are connected with each other via a connecting web 409, which is arranged between the two contact ramps 408a and 408b.

As shown in FIG. 16, each of the fingers 406a and 406b includes a terminal element 410a and 410b at the bottom-side end, and each of the terminal elements 410a and 410b has an actuating elements 411a and 411b formed with a rough or fluted structure for the manual operation. Further, the verifier 404 includes at least one arm 428 extending transversely (i.e., downwardly or in a radial direction) from a combined end 430 outside the connector body 412 and having an extension end 432 extending along the longitudinal axis. The extension end 432 of the verifier 404 covers the verification element 90 when the plug lock 402 is in the unlatched position (see FIG. 15B), and uncovers the verification element 90 when the plug lock 402 is automatically moved to the latched position from the unlatched position (see FIG. 15A).

Figure 17A:
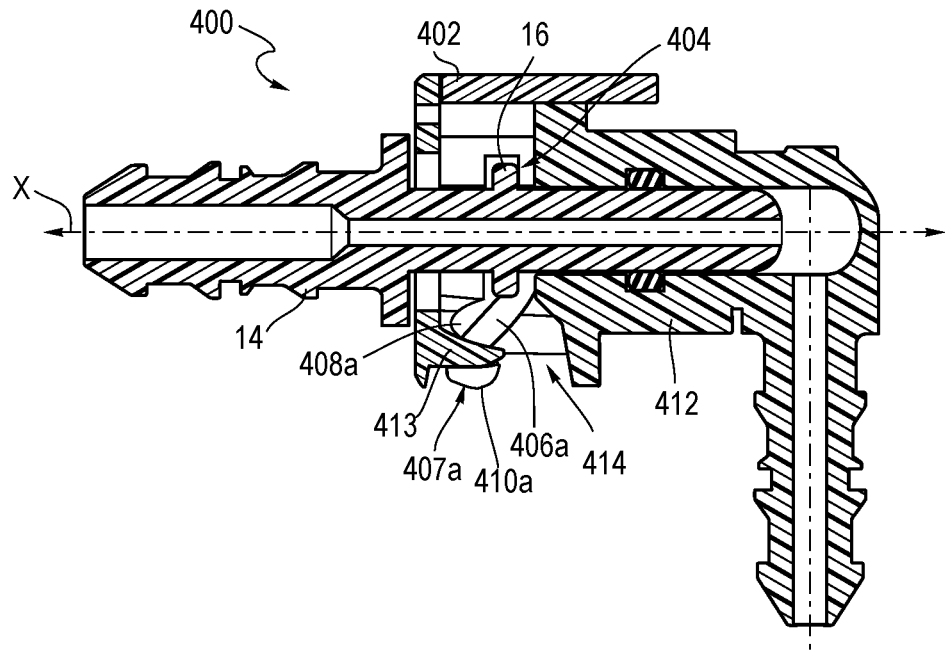
FIG. 17A shows a cross-sectional view of the coupling connector of FIG. 15A along a longitudinal direction.
Figure 17B:
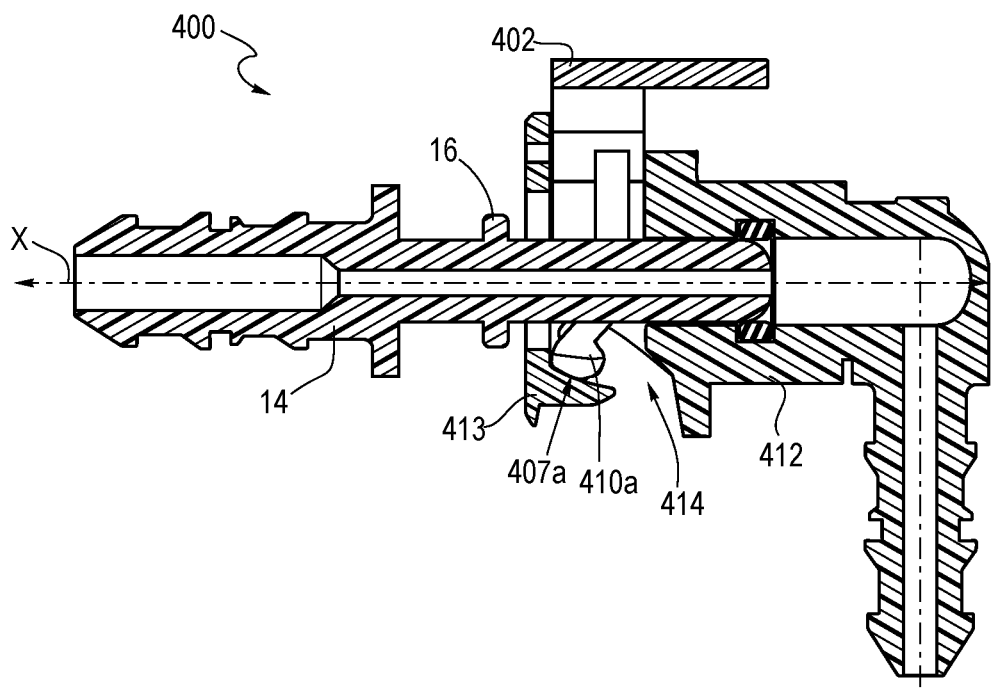
FIG. 17B shows a cross-sectional view of the coupling connector of FIG. 15B along a longitudinal direction.

FIGS. 17A and 17B show cross-sectional views of FIGS. 15A and 15B along the longitudinal direction. In FIG. 17B, the plug lock 402 is in the unlatched position, while the male member 14 has been partially inserted into the connector body 412 such that one of the impact surfaces 407a and 407b of the plug lock 402 abuts or strikes against the projection 413 (only a half of the projection shown in FIGS. 17A and 17B)) formed in the connector body 412. In FIG. 17A, when the male member 14 is completely inserted into the connector body 412, the upset 16 of the male member 14 touches one of the contact ramps 408a and 408b, as a result of which the fingers 406a and 406b of the verifier 404 are elastically deflected axially rearward. This deflection builds up an elastic, mechanical stress in the plug lock 402 or in the verifier 404, until the terminal elements 410a and 410b reach the bottom opening 414 (only a half of the opening shown in FIGS. 17A and 17B) of the connector body 412. As soon as a sufficient axial deflection of the fingers 406a and 406b has been reached, an axially forward tip of the terminal elements 410a and 410b and an axial rearward tip of the projection 413 no longer touch each other. In this transition moment, the spring-elastic energy stored in the verifier 404 or in the fingers 406a and 406b is released, so that the plug lock 402 is automatically and abruptly pulled from the unlatched position into the latched position, and as shown in FIG. 17A, the coupling connector 400 is securely connected. Further, the plug lock 402 can be moved into the unlatched position through manual operation. Accordingly, when the male member 14 is completely inserted into the connector body 412, the plug lock 402 is automatically moved to the latched position such that the verification element 90 of the connector body 412 is no longer covered by the extension end 432, which can be readable or detectable, and read out by the readable machine.

In the present disclosure, the term "readable" or "detectable" means in particular that the code can be read out completely and correctly by the readable machine. In the unlatched position of the verifier 200 (FIG. 1A), for example, the code (the verification element 90) cannot be read out completely because the code is fully or partially covered by the extension end 232 of the verifier 200. Accordingly, the verification element 90 of the connector body 12 is not readable or detectable. When the male member 14 properly inserted into the connector body 12, the verifier 200 can be moved down into the latched position and the code is fully uncovered such that the code is readable and can be read out completely by the readable machine as shown in the example of FIG. 1.

According to the present disclosure, the verification element 90 is attached to the connector body 12 by at least one of the methods such as a printing, a laser marking, a labeling, an engraving, etc. Further, the verification element 90 can contain readable information relating to the quick connector, in particular relating to the manufacturer, the article number, the type and material, the date of manufacture, and the batch number of the connector. Such information is advantageous in the course of assembly and maintenance of the connector so that the verification element 90 of the present disclosure combines the verification of the correct connection and also the connector-specific information of the quick connector.

As shown in FIGS. 1 and 1A, the clear indication of the correct connection of the quick connector coupling 10 or the verification of the correct connection of the quick connector coupling 10 is achieved by simple measures which are described above. Accordingly, the quick connector coupling 10 with the verification element 90 of the present disclosure can be accomplished by low manufacturing costs. In addition, through the simple and yet very functionally reliable process of a verification or a display of the correct connection of the quick connector coupling 10, the susceptibility to errors in the connection of the quick connector is reduced so that the connection errors can largely be excluded.

The foregoing description of various forms of the invention has been presented for purposes of illustration and description. It is not intended to be exhaustive or to limit the invention to the precise forms disclosed. Numerous modifications or variations are possible in light of the above teachings. The forms discussed were chosen and described to provide the best illustration of the principles of the invention and its practical application to thereby enable one of ordinary skill in the art to utilize the invention in various forms and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A quick connector coupling for making a severable connection with a male member in a fluid line, the quick connector coupling comprising:
   a connector body having a through bore for receiving the male member, the male member having a tubular shape sized to extend into the through bore of the connector body;

at least one verification element formed on the connector body; and a verifier including a connecting member and a pair of fingers extending from the connecting member, the verifier further including a combined upper end extending rearwardly from the connecting member of the verifier and at least one arm extending from the combined upper end, wherein the verifier is coupled to the connector body and moved to a latched position from an unlatched position when the male member is inserted and securely connected with the connector body, and wherein the at least one verification element of the connector body is at least partially covered by the at least one arm extending from the verifier in the unlatched position, and wherein the verification element of the connector body is uncovered and readable when the at least one arm of the verifier is moved to the latched position in a transverse direction relative to an insertion direction of the male member.

2. The quick connector coupling of claim 1, further comprising a retainer releasably securing the male member within the connector body.

3. The quick connector coupling of claim 1, wherein the through bore of the connector body defines a longitudinal axis, and wherein the at least one arm is axially spaced apart from the pair of fingers.

4. The quick connector coupling of claim 3, wherein the connector body includes a radial rim extending through the axial space between the at least one arm and pair of fingers.

5. The quick connector coupling of claim 2, wherein the retainer is positioned on an opposite side of the connector body from where the verifier is positioned such that the retainer is inserted in an opposite direction from a direction in which the verifier is moved to the latched position.

6. The quick connector coupling of claim 1, wherein the at least one verification element is positioned on an outer surface of the connector body.

7. The quick connector coupling of claim 6, wherein the at least one verification element is arranged between a rearward rim and a rearmost rim of the connector body.

8. The quick connector coupling of claim 1, wherein the at least one verification element is a readable code formed as a QR code, a barcode, a data matrix code, or a colored code.

9. The quick connector coupling of claim 1, wherein the at least one arm of the verifier is formed with an extension end transversely extending from the at least one arm along a longitudinal axis of the connector body.

10. The quick connector coupling of claim 9, wherein the extension end of the verifier is arranged between a rearward rim and a rearmost rim of the connector body and moved along an outer surface of the connector body.

11. The quick connector coupling of claim 9, wherein in the unlatched position of the verifier, the verification element is at least partially covered by the extension end of the verifier, and the verification element is fully uncovered by the movement of the extension end when the verifier is moved to the latched position from the unlatched position.

12. The quick connector coupling of claim 1, wherein the at least one verification element produces information about the quick connector coupling when the verification element is read out.

13. The quick connector coupling of claim 1, wherein the at least one verification element is attached onto an outer surface of the connector body by a printing, a laser marking, a labeling, or an engraving.

14. A quick connector coupling for making a severable connection with a male member in a fluid line, the quick connector coupling comprising:

a connector body having a through bore for receiving the male member, the male member having a tubular shape sized to extend into the through bore of the connector body;

at least one verification element formed on the connector body;

a verifier including a crossbar and a pair of fingers extending from the crossbar, the verifier further including at least one arm extending outside the connector body; and a retainer securing the male member within the connector body, wherein the verifier is formed with the retainer, the retainer including a pair of legs extending from the crossbar, wherein the verifier and retainer are coupled to the connector body and moved to a latched position from an unlatched position when the male member is inserted and securely connected with the connector body, and wherein the at least one verification element of the connector body is at least partially covered by the at least one arm extending from the verifier in the unlatched position, and wherein the verification element of the connector body is uncovered and readable when the at least one arm of the verifier is moved to the latched position in a transverse direction relative to an insertion direction of the male member.

15. The quick connector coupling of claim 14, wherein the combined retainer and verifier is automatically moved to the latched position from the unlatched position when the male member is completely inserted into the connector body.

16. The quick connector coupling of claim 14, wherein the pair of fingers are longitudinally aligned with the pair of legs.

17. The quick connector coupling of claim 14, wherein the at least one arm of the verifier is longitudinally spaced apart from the pair of fingers of the verifier.

18. A quick connector coupling for making a severable connection with a male member in a fluid line, the quick connector coupling comprising:

a connector body having a through bore for receiving the male member having a tubular shape sized to extend into the through bore of the connector body, the connector body including at least one verification element;

a retainer securing the male member within the connector body; and a verifier including at least one arm extending outside the connector body, the verifier coupled to the connector body and moved to a latched position from an unlatched position when the male member is securely connected with the connector body, the at least one arm including an extension end transversely extending from the at least one arm along a longitudinal axis of the connector body, the extension end sized and positioned to cover the at least one verification element in the unlatched position, wherein the at least one verification element of the connector body is readable when the verifier is moved to the latched position from the unlatched position, and wherein the retainer is positioned on an opposite side of the connector body from where the verifier is positioned such that the retainer is inserted in an opposite direction from a direction in which the verifier is moved to the latched position.

19. The quick connector coupling of claim 18, wherein the at least one verification element is located on an outer surface of the connector body is at least partially covered by the arm of the verifier and is not readable when the verifier is in the unlatched position and wherein the at least one verification element is fully uncovered and readable by the movement of the arm when the verifier is moved to the latched position.

20. The quick connector coupling of claim 18, wherein the verifier is formed with a pair of arms including a combined upper end extending rearwardly from a connecting member of the verifier.

\* \* \* \* \*